United States Patent [19]

Will

[11] Patent Number: 5,024,531

[45] Date of Patent: Jun. 18, 1991

[54] DEVICE FOR CONTINUOUS DEGASSING OF MIXES

[75] Inventor: Manfred O. Will, Wülfrath, Fed. Rep. of Germany

[73] Assignee: KWM-Kunststoffmaschinen GmbH, Wulfrath, Fed. Rep. of Germany

[21] Appl. No.: 354,253

[22] Filed: May 18, 1989

[30] Foreign Application Priority Data

May 27, 1988 [DE] Fed. Rep. of Germany ....... 3818003

[51] Int. Cl.⁵ ............................. B01F 7/02; B29B 1/10
[52] U.S. Cl. ........................................ 366/75; 366/76; 425/405.1
[58] Field of Search ................. 366/75, 76, 77, 78, 366/79, 80, 81, 82, 83, 87, 88, 89, 90, 318, 319, 322, 323; 425/200, 207, 208, 376.1, 382.4, 405.1, DIG. 60; 159/2, 3

[56] References Cited

U.S. PATENT DOCUMENTS

| | | |
|---|---|---|
| 3,562,379 | 2/1971 | Duggins . |
| 3,633,880 | 1/1972 | Newmark . |
| 3,985,348 | 10/1976 | Skidmore ............................. 366/75 |
| 4,129,543 | 12/1978 | Kaplan . |
| 4,260,264 | 4/1981 | Maki ..................................... 366/75 |
| 4,473,673 | 9/1984 | Williams et al. . |
| 4,652,596 | 3/1987 | Williams et al. . |

FOREIGN PATENT DOCUMENTS

3207432C2  4/1985  Fed. Rep. of Germany .
3637775A1  5/1988  Fed. Rep. of Germany .

*Primary Examiner*—Robert W. Jenkins
*Attorney, Agent, or Firm*—Thomas R. Vigil

[57] ABSTRACT

A device for continuous degassing of a mix of liquids and solids, such as, polymer binding agents and filler materials and/or fibers is disclosed. In this invention, an inlet housing (1), which is to contain the mix, and a vacuum chamber (6) in direction of transport in a distance from the inlet housing are directly connected with a conveying unit (2). A part of the conveying unit (2) itself is designed as a metering unit (11).

Mixes of liquids and solids, such as polymer binding agents and filler materials and/or fibers are degassed in the device and the complete mix is placed in an inlet housing, open to the atmosphere, and the unitary, multizoned conveying screw carries the mix from the inlet housing. The mix in the inlet housing, and in the conveying screw creates a pressure-seal at vacuum chamber. The unitary screw carries the mix into the vacuum chamber, allowing sufficient residence time for degassing of air bubbles, carries the resulting mix into a second, down stream sealing section, and to the discharge point.

16 Claims, 1 Drawing Sheet

DEVICE FOR CONTINUOUS DEGASSING OF MIXES

BACKGROUND OF THE INVENTION

1. Field of the Invention

The invention relates to a device for continuous degassing of mixes, such as liquids and solids, for example, mixes of polymer binding agents and fillers and/or fibers. The machine involves a vacuum chamber, which is combined in a gas-tight connection with a simple conveying unit, which, when containing the mix, is gas-tight towards the outside.

2. Description of the Prior Art

In the prior art, mixes, for example polymer mortars, are known to contain large amounts of gas, especially air bubbles, so that they are not suitable for certain fields of applications, for example electrical insulators. To remove the gas, especially air-bubbles, degassing devices are used.

A degassing device of this type is described in DE-OS 3637775. That known device includes a metering unit, and the filling level of the mix is sensed, and valves, controlled in response to the sensed filling level, are arranged on tubes between vacuum chamber and metering unit through which the mix is sucked into the vacuum chamber. The metering unit borders on the inlet of the vacuum chamber. A screw arranged in a hollow cylindrical housing follows the vacuum chamber as a conveying unit. The metering of the mix in the screw is determined by the extent of the low pressure in the vacuum chamber, the cross sections of the valves, the dimensions of the tubes, and the viscosity of the mix. The speed of the screw is adapted to the metering capacity. The mixes to be degassed may only contain filler materials of fine graining. Additionally, the known device is rather costly.

Such disadvantages are overcome by this invention. This invention, though in the field described above, also accommodates mixes of high viscosities and low binder contents with coarse grain fillers for degassing in a simpler process.

SUMMARY OF THE INVENTION

In accordance with this invention, these objects are achieved with the novel combination of elements comprising an inlet housing, containing mix of liquid and solids, such as polymer binding agents and filler materials and/or fibers, from a mixing machine, for example, and also comprising a vacuum chamber, the latter in direction of transport at a distance from the inlet housing, said housing and vacuum chamber being directly connected by a conveying unit. The part of the conveying unit in the area of the inlet housing is designed as a metering unit.

In this invention, the costly metering unit of the prior art is eliminated. The necessary metering is made by a part of the conveying unit itself, by the part below the inlet housing in cooperation with the vacuum chamber. This part of the conveying unit feeds or meters the mix "normally" out of the area of the inlet housing. In the area following the inlet housing, in the direction of transport, which area is preferably designed as a compression zone, a packing of the mix takes place. From this packing the vacuum chamber, supported by the conveying unit, subjects the mix to be degassed to a low pressure continuously, and degasses it. In spite of the low pressure in the vacuum chamber, the pressure of the mix against the moving parts and against the not-moving parts of the conveying unit before the vacuum chamber is great enough not to have an uncontrolled sucking of mix into the vacuum chamber. With the adjustable low pressure in the vacuum chamber the quantity of mix sucked in and the degree of degassing can be regulated. To achieve the gas-tightness in the conveying unit after the vacuum chamber the conveying unit in that area is also designed as a compression zone.

The conveying unit of the invention is designed as a screw which is arranged in a hollow cylindrical housing. In this screw the metering, compression and decompression zones can be formed by different pitches of the screw, by different diameters of the screw core, by interruptions of the screw pitch or by cuts in the screw thread like slots.

When binder rich mixes with fine grain fillers are used, the metering is influenced not only by the speed of the screw but also by the degree of vacuum. In such cases it is of advantage to interrupt the screw thread in the area directly before the vacuum chamber and to incorporate a pressure element there.

DESCRIPTION OF THE PREFERRED EMBODIMENT(S)

Figure 1:
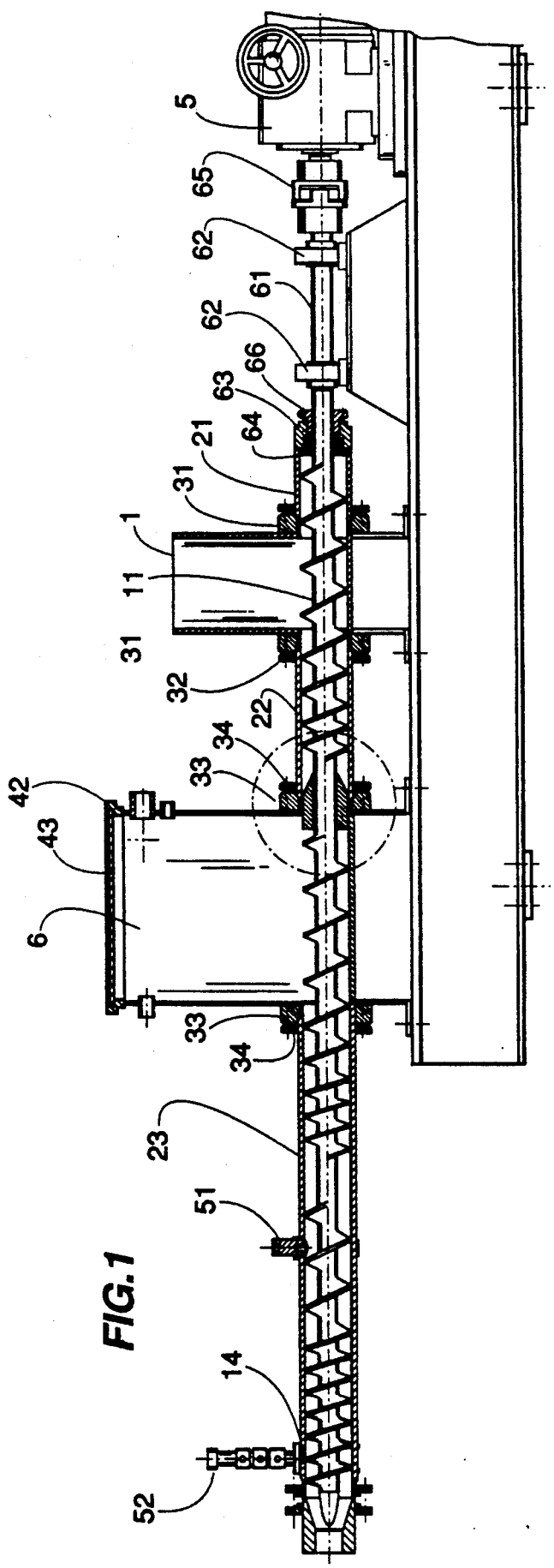
FIG. 1 is a side elevational view of the degassing device of the present invention with the cylinder of the device shown in vertical section thereby to illustrate the various chambers in the device and the screw conveyor metering unit therein.
Figure 2:
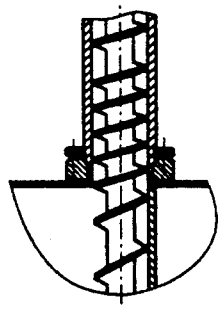
FIG. 2 is a fragmentary sectional view of a modification of the connection between the vacuum chamber and the packing cylinder portion of the cylinder of the device.

From a not-shown mixing machine, which for example can be the machine described in DE-PS 3207432, a mix of liquids and solids, such as binding agents and fillers and/or fibers is fed to the inlet housing 1, with which a conveying unit 2 is in gas-tight connection. The mix can be in a continuous feed or made in batches in a machine or manually in a container.

In the illustrated design example, a screw 3 and a hollow cylindrical housing 4 is shown as conveying unit 2. The screw 3 is driven by a drive 5 according to the principle of a shaft with bearings on one side or end, only. In direction of transport at a distance from the inlet housing 1 a vacuum chamber 6 is shown, which is also in gas-tight connection with the conveying unit 2. The degassed mix leaves the conveying unit 2 at the outlet 7.

The conveying unit 2, consisting of screw 3 and housing 4 includes zones of different design in direction of transport. In the area below the inlet housing 1, and in the part reaching into the housing 4 the conveying unit 2 is designed as a metering unit 11. In the area below the vacuum chamber 6 and further reaching into housing 4, the conveying unit 2 is designed as decompression zone 12.2. In the areas between the metering unit 11 and the decompression zone 12.2, after the decompression zone 12.2 and at the outlet of the conveyor compression zones 13 are shown. Between the compression zones 13.2 and 13.3 a decompression zone 12.1 is shown. The metering unit 11, the decompression zones 12 and the compressions zone 13 are e.g. formed by different pitches of the screw 3. It is possible to form these zones by different diameters of the screw core 14.

The hollow cylindrical housing 4 consists of different parts: The part of the housing 4 which is connected with the inlet housing 1 against the direction of transport, consists of a tube flange 21. The part of the housing 4 between the inlet housing 1 and the vacuum chamber 6 consists of a packing cylinder 22. The part of the housing 4 which is connected with the vacuum chamber 6 in the direction of transport, consists of a mixing cylinder 23.

The screw thread can, as an alternative, be interrupted in the area of the compression zone 13.1 directly before the vacuum chamber and equipped with a pressure piece 69. The pressure piece 69 is dimensioned that on the one hand side the pressure of the mix in the compression zone 13.1 guarantees the sealing of the vacuum in the vacuum chamber 6 against the inlet housing 1 and that on the other hand, the screw 3 transports the mix through the gap between pressure piece 69 and packing cylinder 22.

The sealing of the vacuum between outlet 7 and vacuum chamber 6 against the atmospheric pressure is achieved by the compression zone 13.2 which has an interrupted screw thread. In this area the mix is pushed in axial direction and compacted, which is enough to achieve the necessary sealing effect. The decompression zone 12.1 following in direction of transport is a zone without pressure and underfilled (not completely filled), into which additional liquid or solid materials can be added to the degassed mix, if necessary.

The compression zone 13.3 which follows the decompression zone 12.1 in direction of transport is designed as mixing or conveying zone. In this area the single- or multi-thread screw 3 is designed that the mixing effect is achieved by slot like interruptions of the screw thread, but that a return flow into the decompression zone 12.1 is avoided.

The end of the compression zone 13.3 is formed by the outlet 7. At the outlet 7 a nozzle 70 is fixed. The nozzle 70 is so designed that it can be filled with flowing mix and that air will not be mixed into the degassed mix at the end of the nozzle. Between the end of the compression zone 13.3 and nozzle 70 valves can be connected, through which other materials, for example contrast colors, can be injected into the mix. Because of the design of screw 3 these contrast colors do not penetrate into the mix completely so that a marble effect is achieved.

The inlet housing 1 formed by a funnel which is open at its inlet is fixed to the conveying unit 2 by two cylinder flanges 31 and securing rings 32, which are put around the hollow cylindrical housing 4 of the conveying unit 2. The vacuum chamber 6 is connected to the conveying unit 2 by two cylindrical devices 33 and flanges 34 which are put around the hollow cylindrical housing 4.

The vacuum chamber 6 is designed as low pressure housing 41. At its upper end the low pressure housing 41 is covered by a transparent panel 43 which is fixed by a frame 42. In the side wall of the low pressure housing 41 there are several connections 44 for a vacuum meter, a regulation valve to adjust the level of the vacuum in the vacuum chamber, a line to a vacuum pump, and a valve through which cleaning liquid (solvent) can be introduced.

In the area of the decompression zone 12 at the outlet of the conveying unit 2 and nozzle 51 for introducing a cleaning liquid and a contrast color valve 52 are shown.

The screw 3 is connected to the drive 5 by a screw shaft 61. The screw shaft 61 is pivoted in two bearings 62. The screw shaft 61 is connected to the screw 3 by a packing housing 63 which is connected to the tube flange 21.

At the packing housing 63 a buffer disk 64 is positioned with a packing seal 65 and a pressure ring 66. The connection of the screw shaft 61 with the shaft of the drive 5 is made by a clutch coupling 67. The drive 5, the inlet housing 1 and the vacuum chamber 6 are all fixed on a frame/support 68.

I claim:

1. An apparatus for continuous degassing of a mix of liquid and solids, such as polymer binding agents and filler materials and/or fibers, said apparatus comprising an inlet housing, open to the atmosphere, a vacuum chamber adjustable to regulate the low pressure therein, and a unitary multi-zoned screw conveyor which provides a first conveying zone between said inlet housing and said vacuum chamber, wherein the mix is metered out of the area of the inlet housing and a vacuum seal is provided on the upstream side of said vacuum chamber by said mix residing in said inlet housing and in said first conveying zone; said screw conveyor also comprising a second conveying zone in said vacuum chamber for allowing said mix to remain in said vacuum section for a period of time sufficient for it to be degassed due to the low pressure in the vacuum chamber, said second zone also including means for conveying the resulting degassed mix out of the vacuum chamber; said multi-zoned screw conveyor also including a third conveying zone down stream of said vacuum chamber for transporting the resulting degassed mix to a discharge port for discharge of the degassed mix into the atmosphere wherein a vacuum seal is provided on the down-stream side of said vacuum chamber by said mix residing in said third conveying zone; said inlet housing, multi-zoned screw conveyor, and said vacuum chamber being joined together to provide a hermetically sealed path of travel for said mix; and said multi-zone screw conveyor providing metering, compression, decompression, and compression zones, in sequence, which zones are formed by respective differences in pitch of flights, and/or by respective differences in diameter of the screw core.

2. An apparatus according to claim 1 in which the first conveying zone and said third conveying zone is designed to provide a mix-compression zone in direction of transport, both after the inlet housing and after the vacuum chamber, respectively.

3. An apparatus according to claim 1 which includes admixing means for admixing catalyst, colorant, or other material to the degassed mix, said admixing means including inlet means for introducing said catalyst, colorant, or other material into said third conveying zone.

4. An apparatus according to claim 1 in which said screw conveyor comprises a screw core in a hollow cylindrical housing, and in which the screw core in the fist, and third zones is formed by at least two different diameters of the screw core, and/or by at least two different pitches of the flights in said core.

5. An apparatus according to claim 4 in which the inlet housing includes funnel means open at its inlet, which is fixed by two cylinder flanges and securing rings, which are put around the following cylindrical housing.

6. An apparatus according to claim 4 in which the vacuum chamber is fixed by two cylindrical devices and flanges which ar put around said hollow cylindrical housing.

7. An apparatus according to claim 1 in which the pitch of the screw, in direction of transport directly before the vacuum chamber is interrupted and the screw core is equipped with a pressure piece.

8. An apparatus for continuous degassing of a mix of liquids and solids, such as polymer binding agents and filler materials and/or fibers said apparatus comprising an inlet housing and a conveyor together constituting a metered mix-feeding zone; said mix-feeding zone including means for conveying said mix to a following vacuum chamber, said conveyor including a treatment zone in said vacuum chamber including means for providing sufficient residence time for said mix in said vacuum chamber to be substantially degassed due to the low pressure in the vacuum chamber, said vacuum chamber having a mix-inlet side and a mix-outlet side, wherein at the mix-outlet side, the vacuum chamber is combined in a gas-tight connection with the conveyor which is gas-tight towards the outside in the down-stream direction when said conveyor contains mix, and wherein said vacuum chamber is combined with the conveyor at the inlet side in gas tight connection, and said conveyor is connected to said inlet housing in gas tight connection towards the outside in the upstream direction, both cooperating to provide a vacuum seal for the vacuum chamber when the conveyor in said mix-feeding zone and said inlet housing contains said mix.

9. An apparatus according to claim 8 in which the conveyor in the mix feeding zone and in said down-stream conveying zone are designed to provide a mix-compression zone in direction of transport, after the vacuum chamber and after the inlet housing, respectively.

10. An apparatus according to claim 8 which includes admixing means for admixing catalyst, colorant, or other material to the degassed mix, said admixing means including inlet means for introducing said catalyst, colorant, or other material into mix in said down-stream conveying zone.

11. An apparatus according to claim 8 including a screw as which is arranged in a hollow cylindrical housing, to provide said conveying means, and in which that the mixfeeding zone, the treatment zone, and the down-stream unit of the conveying unit are formed by at least two different pitches of the screw.

12. An apparatus according to claim 11 in which the inlet housing includes funnel means open at its inlet, which inlet housing is fixed by two cylinder flanges and securing rings, which are put around the following cylindrical housing.

13. An apparatus according to claim 11 in which the vacuum chamber is fixed by two cylindrical devices and flanges which are put around said hollow cylindrical housing.

14. An apparatus according to claim 8 in which the pitch of the screw in the mix-feeding zone, in direction of transport directly before the vacuum chamber is interrupted and the screw core is equipped with a pressure piece.

15. An apparatus according to claim 8 in which said conveyor in said down-stream unit includes slotted flights.

16. An apparatus according to claim 8 in which the conveying unit is a combination of a unitary multi-zone screw with a hermetically sealed housing, said multi-zone screw providing metering, compression, decompression, and compression zones, in sequence, which zones are formed by respective differences in pitch of flights, and/or differences in diameter of the screw core.

* * * * *